B. B. AYERS.
TOWING CABLE.
APPLICATION FILED OCT. 12, 1914.
1,147,914.
Patented July 27, 1915.
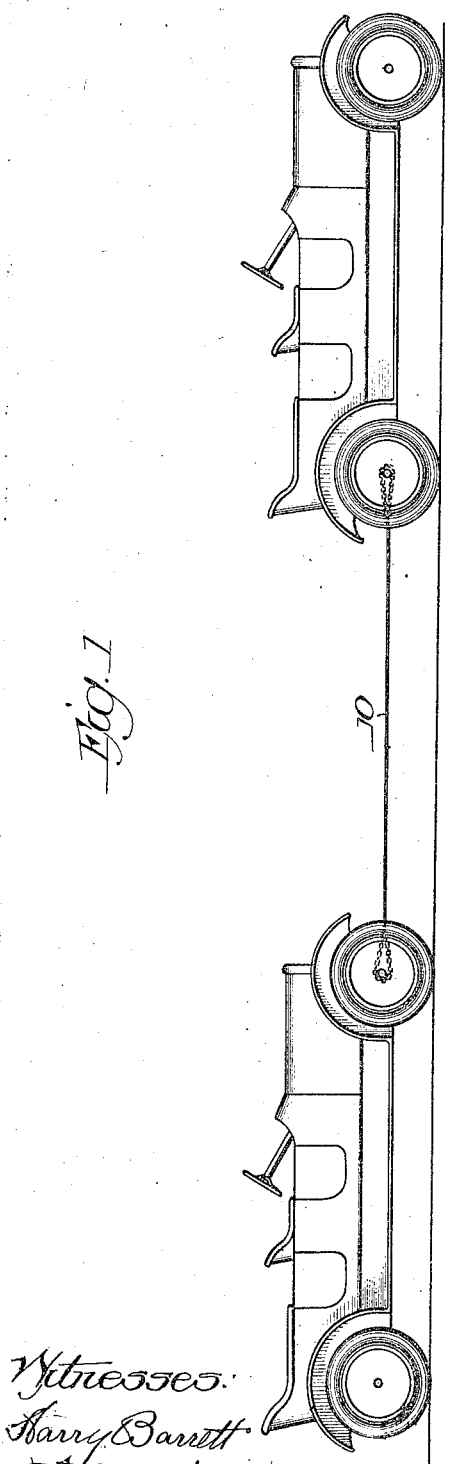
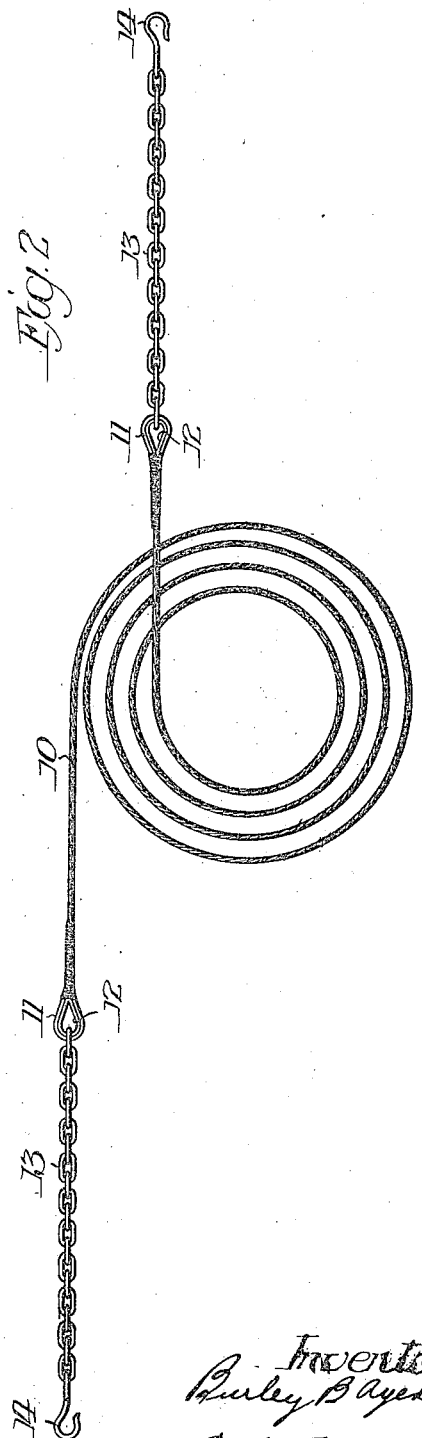

UNITED STATES PATENT OFFICE.

BURLEY B. AYERS, OF CHICAGO, ILLINOIS.

TOWING-CABLE.

1,147,914.  Specification of Letters Patent.  Patented July 27, 1915.

Application filed October 12, 1914. Serial No. 866,297.

*To all whom it may concern:*

Be it known that I, BURLEY B. AYERS, a citizen of the United States, residing at Chicago, in the county of Cook and State of Illinois, have invented certain new and useful Improvements in Towing-Cables, of which the following is a specification.

My invention relates to a novel device particularly adapted as a towing cable for automobiles and like vehicles.

As is well known it occasionally becomes necessary or desirable to tow a vehicle behind another of such vehicles and the lack of a rope or similar device usually occasions much delay and inconvenience.

An object in the present construction is to provide a towing device which shall be of such light weight and simple construction as will enable its being carried in the tool kit of any automobile and be available when necessary. In order to secure the necessary strength in a hemp rope it is necessary to provide a rope of considerable cross sectional area and such a rope occupies much space, deteriorates by contact with oils or grease and is therefore not usually carried by motorists.

The present device is constructed with the object in view of providing a simple, light, durable device which may be readily attached to the axles of the vehicles and not be attacked by grease or oils.

The invention will be more readily understood by reference to the accompanying drawings, wherein, Figure 1 is a side elevation of two automobiles with my novel towing cable connecting the two, and, Fig. 2 is a plan view of a complete cable.

As shown I prefer to construct the major portion of the device in the form of a wire cable which may be braided, twisted or woven as desired. This cable 10, is provided at its ends with a loop 11, reinforced by the metal eye 12, the cable terminating at each end in a chain 13, having a hook 14, on the free end thereof. This hook is adapted to engage the eye 12, and form a ready connection around the axle of a vehicle. Such a device may be constructed very cheaply and be of such light weight and small volume as to make the same attractive to motorists.

The construction is capable of considerable modification in the form of the axle attaching means and such modifications as are within the scope of my claims I consider within the spirit of my invention.

I claim:

1. In a device of the class described, the combination of a flexible wire cable having eyes at its ends, and flexible attaching devices secured to said eyes and adapted to provide means for attachment to a vehicle axle, substantially as described.

2. In a device of the class described, the combination of a flexible wire cable having eyes at its ends and short chains secured to said eyes and provided with hooks by means of which the device may be secured to a vehicle axle, substantially as described.

3. In a device of the class described, the combination of a relatively light, flexible wire cable having loops formed in its ends, a chain secured to each loop and a hook provided at the outer end of said chain, substantially as described.

BURLEY B. AYERS.

Witnesses:
A. F. ALLEN,
F. B. LEYNS.